(12) United States Patent
Schoessler et al.

(10) Patent No.: US 11,707,848 B2
(45) Date of Patent: *Jul. 25, 2023

(54) ROBOTIC VISION

(71) Applicant: Samsung Electronics Company, Ltd., Suwon-si (KR)

(72) Inventors: Philipp Schoessler, Scotts Valley, CA (US); Thibault Neveu, Mountain View, CA (US); Dane Mason, Mountain View, CA (US); Kathleen Sofia Hajash, San Francisco, CA (US); Brian Thomas Harms, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,789

(22) Filed: Aug. 5, 2022

(65) Prior Publication Data

US 2022/0371202 A1 Nov. 24, 2022

Related U.S. Application Data

(63) Continuation of application No. 16/792,009, filed on Feb. 14, 2020, now Pat. No. 11,433,545.
(Continued)

(51) Int. Cl.
*B25J 9/16* (2006.01)
*B25J 9/04* (2006.01)
(Continued)

(52) U.S. Cl.
CPC ............ *B25J 9/1697* (2013.01); *B25J 9/042* (2013.01); *B25J 9/1005* (2013.01); *B25J 9/1666* (2013.01); *G06T 7/11* (2017.01); *G06T 7/75* (2017.01)

(58) Field of Classification Search
CPC ........ B25J 9/1697; B25J 9/042; B25J 9/1005; B25J 9/1666; G06T 7/11; G06T 7/75
(Continued)

(56) References Cited

U.S. PATENT DOCUMENTS 9,465,980 B2 * 10/2016 Craig ...................... G06F 3/011
10,881,464 B2 * 1/2021 Odermatt ............... A61B 5/107
(Continued)

FOREIGN PATENT DOCUMENTS

WO WO 2018/236753 A1 12/2018

OTHER PUBLICATIONS

EPO Search Report in EP 20 86 1193, dated Jun. 23, 2022.
(Continued)

*Primary Examiner* — Jaime Figueroa

(57) ABSTRACT

A method includes accessing RGB and depth image data representing a scene that includes at least a portion of a robotic limb. Using this data, a computing system may segment the image data to isolate and identify at least a portion of the robotic limb within the scene. The computing system can determine a current pose of the robotic limb within the scene based on the image data, joint data, or a 3D virtual model of the robotic limb. The computing system may then determine a desired goal pose, which may be based on the image data or the 3D virtual model. Based on the determined goal pose, the computing device determines the difference between the current pose and the goal pose of the robotic limb, and using this difference, provides a pose adjustment that for the robotic limb.

20 Claims, 8 Drawing Sheets

Related U.S. Application Data

(60) Provisional application No. 62/957,904, filed on Jan. 7, 2020, provisional application No. 62/895,310, filed on Sep. 3, 2019, provisional application No. 62/806,899, filed on Feb. 17, 2019.

(51) Int. Cl.
*B25J 9/10* (2006.01)
*G06T 7/73* (2017.01)
*G06T 7/11* (2017.01)

(58) Field of Classification Search
USPC ............... 700/245–264; 318/568.11–568.25
See application file for complete search history.

(56) References Cited

U.S. PATENT DOCUMENTS

| | | | |
|---|---|---|---|
| 11,219,526 B2 * | 1/2022 | Mahfouz | ............... G16H 50/50 |
| 2010/0197390 A1 * | 8/2010 | Craig | ..................... G06V 40/20 |
| | | | 463/30 |
| 2018/0199995 A1 * | 7/2018 | Odermatt | ............... A61B 6/505 |
| 2019/0015213 A1 * | 1/2019 | Mahfouz | ................. G16Z 99/00 |

OTHER PUBLICATIONS

Bohg, Jeannette et al., "Robot Arm Pose Estimation through Pixel-Wise Part Classification", 2014 IEEE International Conference on Robotics and Automation (ICRA), IEEE, May 31, 2014.

* cited by examiner

ROBOTIC VISION

PRIORITY

This application claims the benefit under 35 U.S.C. § 120 as a continuation of U.S. patent application Ser. No. 16/792,009, which claims the benefit, under 35 U.S.C. § 119(e), of U.S. Provisional Patent Application No. 62/957,904, filed 7 Jan. 2020; U.S. Provisional Patent Application No. 62/895,310, filed 3 Sep. 2019; and U.S. Provisional Patent Application No. 62/806,899, filed 17 Feb. 2019, all of which are incorporated herein by reference.

TECHNICAL FIELD

This disclosure generally relates to methods and systems to identify and adjust positioning in the field of robotics.

BACKGROUND

Robotic systems are used in a variety of applications. For example, robots are utilized in various commercial and industrial applications such as (1) automotive and aircraft manufacturing, (2) medical surgery, and (3) chemical and pharmaceutical synthesis, among others. Robotic systems maintain a distinct advantage over human labor in some applications as they provide cheap, consistent labor that can repeat a task with a higher degree of precision than a human laborer, for example in hazardous environments.

Robotic systems often require some user input for successful operation. Under one input method, the robotic system is directly piloted in real-time by a human operator, usually through remote control, to complete the task. This is common for tasks that still require human judgment but are difficult for a human to perform due to the nature of the environment. Examples include medical surgeries, welding, or chemical synthesis involving hazardous chemicals. Under another input method, the robotic system is programmed, usual via software, to complete and repeat a task without consistent human oversight. The ability of the robotic system is thus limited by the nature of the instructions provided and the fidelity of the components used. This input method predominates in robotic systems that complete and repeat simple tasks, often in industrial, manufacturing, and residential environments.

DESCRIPTION OF EXAMPLE EMBODIMENTS

Components in a robotic system may not be 100% accurate. For example, slack in mechanical components may create a mismatch between a robotic system's detected posture and its actual posture in physical space. The effects of slack from individual components can compound, creating even greater inaccuracy in the robotic system. Such inaccuracy can make simple tasks, such as gripping objects, difficult as it results in robotic limb's end-effector gripping objects in the incorrect position.

The effects of inaccuracies such as slack can be particularly pronounced in robots designed for consumer use. Unlike industrial or manufacturing environments, robotic systems designed for consumer use have relaxed design requirements to successfully complete tasks. For example, tasks in the home usually require less accuracy than the hyper-precise movements required in automotive or aircraft manufacturing. Further, many tasks in the home may not require payloads above two kilograms, so robotic limbs can be designed for lower loads, reducing costs relative to manufacturing robotic systems.

However, the home environment may also create design demands that are not present in the industrial or manufacturing environments. For example, the home environment creates greater demands to design a lightweight, low cost, aesthetically pleasing robotic system while maintaining enough accuracy and precision to successfully complete the task. Additionally, relatively cheaper components oftentimes become even less accurate over time due to natural wear, which may result from repeated loading, heat expansion, cable stretch, etc. during usage. Thus, one challenge in designing robotics systems for consumer use can be to find a proper balance between using lighter, cheaper components while minimizing inaccuracies at each joint in the robotic system that compound into larger spatial errors at the robotic limb's end-effector.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

Figure 1:
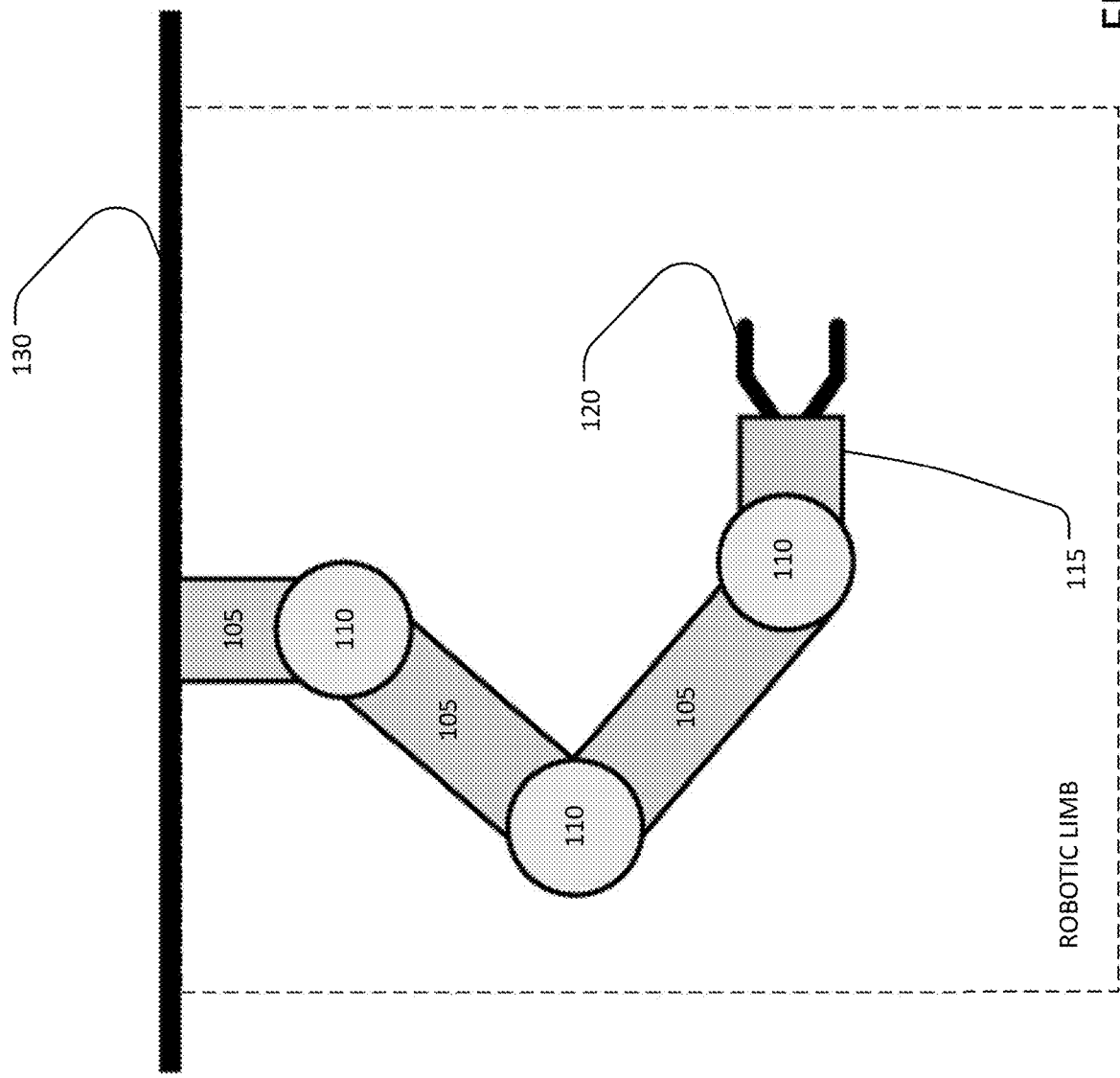
FIG. 1 illustrates an example robotic limb and apparatus.

In particular embodiments, a computer vision system ("CV system" or "computing system") tracks multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb. FIG. 1 illustrates an example robotic limb 100. Robotic limb 100 may include any suitable combination of one or more limb segment 105, joint 110, and end-effector 115. In some embodiments, robotic limb 100 may further include one or more manipulators. For example and not by way of limitation, this manipulator may include one or more finger 120, a suction-based gripper, or a jammable-based gripper. In some embodiments, robotic arm 100 may be connected at one end to a fixed surface 130. For example and not by way of limitation, this fixed surface may include a wall, a ceiling, a cabinet, a workbench, etc.

Figure 2:
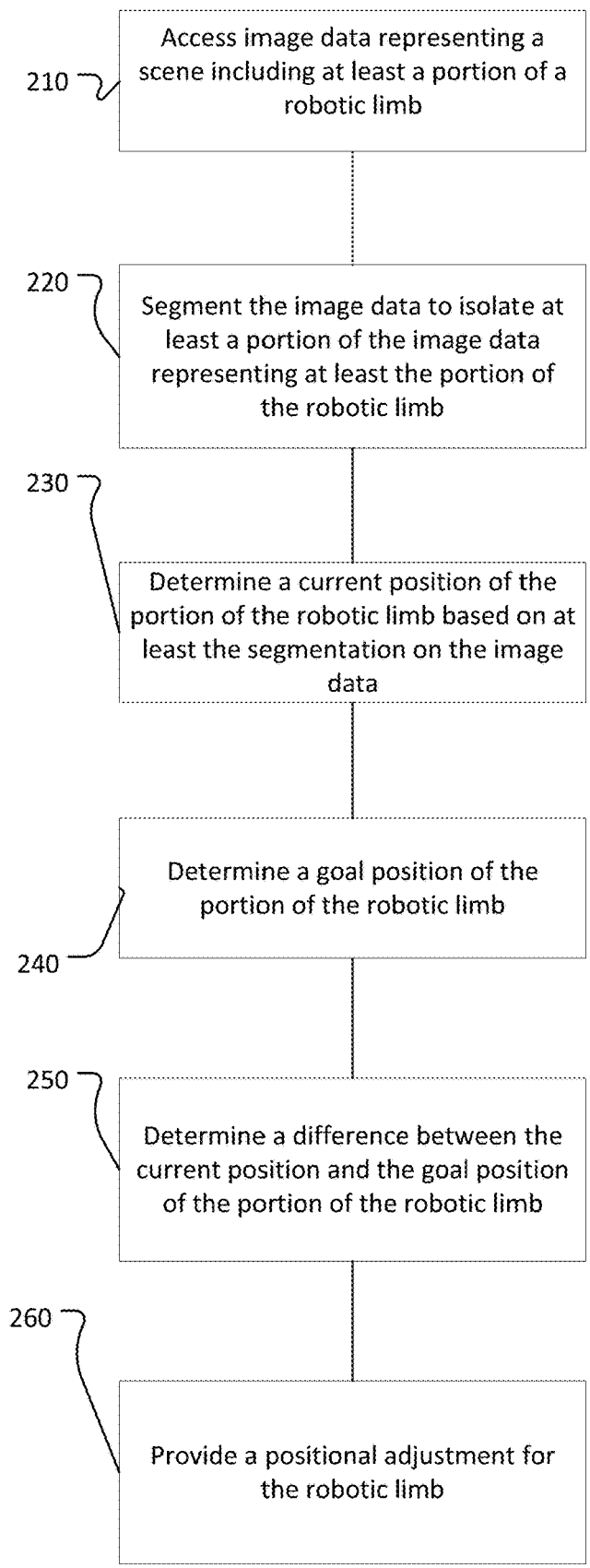
FIG. 2 illustrates an example method for determining the current pose of a robotic limb and providing instructions for a pose adjustment.

FIG. 2 illustrates an example method for achieving a desired pose for the robotic limb. The method may begin at step 210, where the computing system accesses image data representing a scene from one or more image sensors. These image sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. In particular embodiments, the image data may be accessed through any marker-based vision system, for example, but not by way of limitation fiducial markers or Optitrack. This image data represents a scene that includes a least a portion of the robotic limb that can thus be utilized by the computing device for various functions related to pose of the robotic limb. This disclosure contemplates that the one or more image sensors can be located on the robotic limb or external to the robotic limb, or both. Other sensors for sensing the pose of a robotic limb may be built into the robotic system of which the limb is a part, and may include joint encoders, computation encoders, limit switches, motor current sensors, or any suitable combination thereof.

At step 220, the computing system segments this image data to isolate at least a portion of the image data that represents at least a portion of the robotic limb. In particular embodiments, this is completed through a point cloud technique. In particular embodiments, the computing system uses the 3D depth sensor data accessed at step 210 to record one or more snapshots of the point cloud of positional data points of the scene. In particular embodiments, these data points may include information about one or more external surfaces contained in the scene, including the external surfaces of the robotic limb, the table surface, and one or more objects contained in the scene. From this, the computing system may segment the image data to isolate a two-dimensional (2D) region that contains at least a portion of one or more objects contained within the scene. From at least a portion of the image data, the computing system segments the image data by creating one or more RGB-D clusters of various objects in the scene. In particular embodiments, the one or more RGB-D clusters of various objects includes a robotic limb contained within the scene.

In particular embodiments, the scene may contain one or more objects that are further segmented and isolated by the computing system. Upon segmenting the image data to isolate the one or more objects in the scene, the computing system can classify the one or more RGB-D clusters of various objects in the scene created from the segmentation of the image data. This classification can be conducted by the computing system via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification determines that at least one of the one or more objects within a scene is a robotic limb. In particular embodiments, the computing system may additionally classify other objects contained within a scene, including for example but not by way of limitation, a coffee mug, a bottle, a vase, a spoon, a plate, a screwdriver, a light bulb, a hand or arm, etc.

Figure 3:
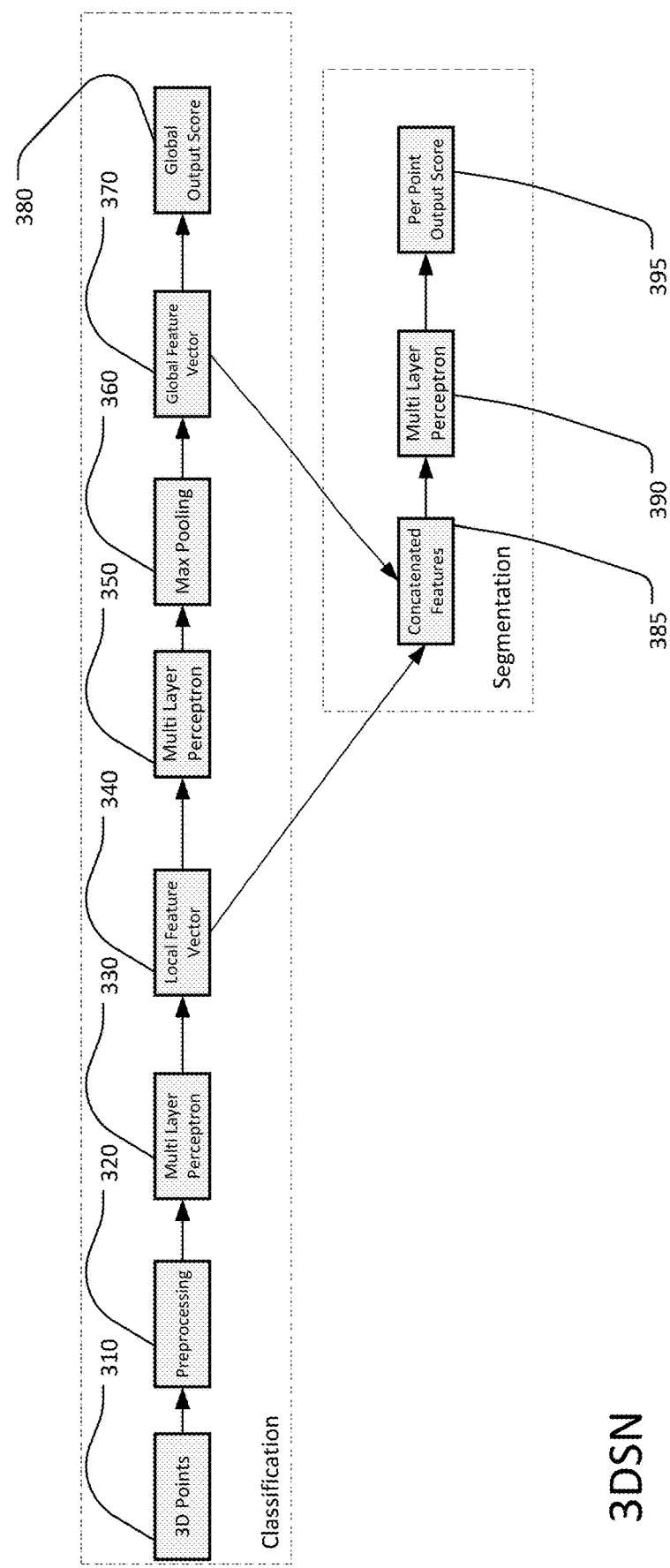
FIG. 3 illustrates an example three-dimensional segmentation network.

In particular embodiments, this object classification is determined via a 3DSN. FIG. 3 illustrates an example of a generic architecture of a 3DSN, however this architecture is merely illustrative, and many different networks utilizing a combination of one or more of the features described herein can be utilized. The 3DSN utilizes one or more snapshots of 3D point clouds collected from the image data in step 210 to classify one or more objects within a scene. At step 310, the 3DSN collects one or more 3D points from available image data. These points are pre-processed at step 320, which may include, for example and not by way of limitation, point clustering, removing noise, removing outliers, or adding or removing points to reach a fixed input number of datapoints. This preprocessing 320 normalizes the data for subsequent processing. At step 330, the 3DSN utilizes a multi-layer perceptron (MLP) as a classifier algorithm to classify the 3D points into one or more objects contained within the scene via approximation. The MLP includes at least an input layer, an output layer, and one or more hidden layers. Each layer consists of one or more transformations that projects the input data into a space where it becomes linearly separable and suitable for processing. This MLP outputs per point feature vectors at step 340, that may represent one or more objects contained within a scene. At step 350, these per point feature vectors are processed through a second MLP. This second MLP may include at least the components of the first MLP identified at step 330. This second MLP 350 outputs a feature vector matrix of the processed per point feature vectors. At step 360, the 3DSN uses a symmetric function, for example and not by way of limitation, max pooling, to transform the per point feature vectors into global feature vectors at step 370. These global feature vectors effectively describe the object as a whole that is contained within the scene. In particular embodiments, the global feature vectors may be subsequently processed through one or more classifiers, for example and not by way of limitation, a fully connected MLP, or a support vector machine (SVM). These features may include, for example and not by way of limitation, contour representations, shape descriptors, texture features, and local features. This leads to a global output score at step 380 that determines the similarity between the identified object in the image data and the predicted object. Both the local feature vector 340 output from MLP 330 and the global feature vector 370 from MLP 350 and max pooling 360 may be subsequently concatenated for use in point segmentation. At step 390 the 3DSN utilizes a third MLP to generate a second per point feature vector, which describes each point with respect to the whole object. This third MLP may include at least the components of the first MLP identified at step 330. In particular embodiments, the second per point feature vector may be processed through a machine learning vector, for example and not by way of limitation, a fully connected layer or an SVM, which will result in a per point output score 395 for each part. The per point output score 395 permit the 3DSN to determine which part each point belongs to. These scores can be used in a variety of applications to classify objects and portions of objects contained within a scene.

In particular embodiments, this object classification may be determined via other artificial intelligence methods, for example and not by way of limitation, 3DSNs such as three-dimensional convolutional neural networks (3DCNNs), Deep Kd-networks, regional convolutional neural networks (RCNNs), or recurrent neural networks (RNNs). These networks may utilize one or more snapshots of 3D pointclouds collected from the image data in step 210 to classify one or more objects within a scene using a combination of one or more of the components outlined above and in FIG. 3. In particular embodiments, these networks may further classify one or more labeled parts of the one or more objects contained within a scene via a global output score and a per part output score that determines the similarity between the identified object in the image data and the predicted object. These scores can be used in a variety of applications to classify objects and portions of objects contained within a scene.

In particular embodiments, upon segmenting and classifying the robotic limb, the computing system may further segment and classify at least one or more portions of the robotic limb. This classification can be conducted by the computing system via any method of classification described above, including for example and not by way of limitation manual identification by a user or any method of artificial intelligence, including machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). For example, and not by way of limitation, the computing system may segment and classify at least a portion of individual limb segments 105, joints 110, end effectors 115 or fingers 120 on robotic limb 100. In particular embodiments, upon segmenting and classifying one or more objects contained within the scene, the computing system may further segment and classify at least a portion of the one or more objects located within the scene.

Figure 4:
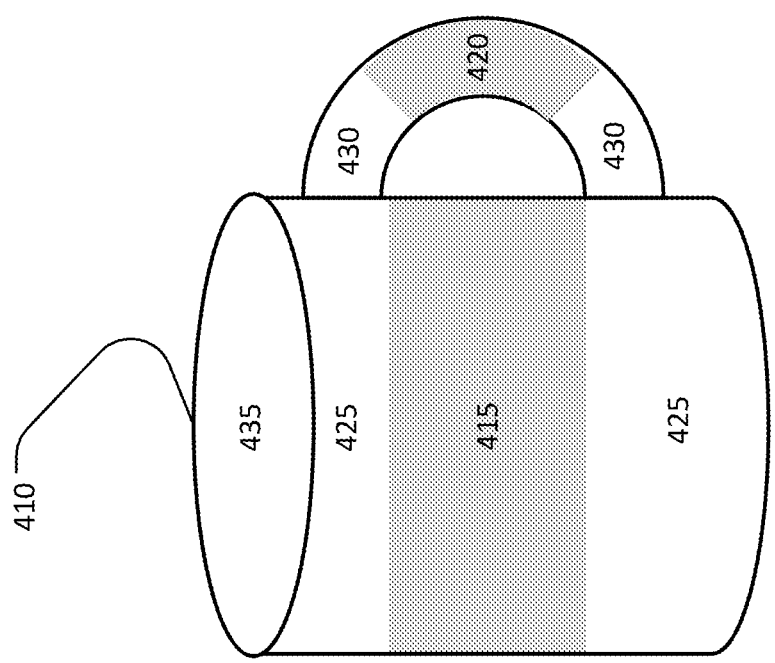
FIG. 4 illustrates an example of object segmentation and isolation.

FIG. 4 illustrates an example of segmentation and classification of a portion of an object. In FIG. 4, coffee mug 410 appears in a scene and has previously been identified and classified according to the steps listed above. In this example the computing system further segments and classifies areas of coffee mug 410 that should be grasped by robotic arm 100, such as the center of the outside of the base of the mug 415 or the center of the coffee mug handle 420, from areas of the mug that should not be grasped by robotic arm 100 to avoid spilling or tipping of coffee mug 410, such as edges of the base of the mug 425 or edges of the handle 430. In another example and not by way of limitation, the computing system may segment and classify the neck of a bottle from the remainder of the bottle, or the opening of a vase from the outer wall. The computing system may further segment stirring or pouring area 435, which may permit robotic limb 100 to interact with coffee mug 410 by, for example and not by way of limitation, stirring or adding to the contents of the vessel.

The classification of objects and the classification of portions of objects by the computing system from the segmented image described herein may be utilized for a variety of applications, including for example and not by way of limitation, object pose estimation, path planning, and object manipulation.

Figure 5A:
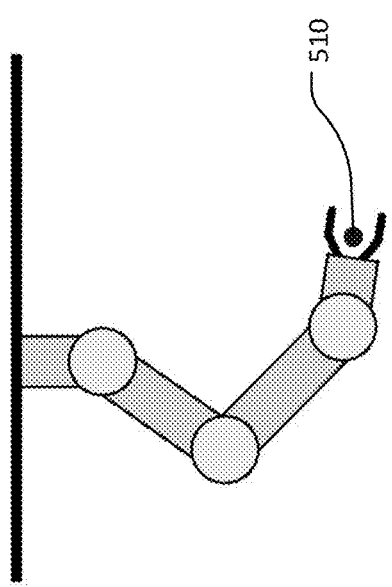
FIGS. 5A, 5B, and 5C illustrate a running example of adjusting a robotic limb from a current pose to a goal pose based on an observed current pose.

At step 230, the computing system utilizes data from the one or more sensors to determine a current pose of at least a portion of the robotic limb. FIG. 5A represents an example current pose of a robotic limb 100. The computing system uses the segmentation data to determine that end effector 115 is located in pose 510. In particular embodiments, the computing system adjusts a 3D virtual model of the robotic limb to its current observed pose based on the image data. The computing system may then determine the current pose of the robotic limb based on joint angles determined from the 3D model of the robotic limb.

In particular embodiments, the computing system may utilize joint data from one or more joint encoders located on the robotic limb to determine the current pose of at least a portion of the robotic limb. These one or more joint encoders may record data related to the robotic limb, including but not limited to the joint angle of one or more joints located on the robotic limb. The measured joint angles measure the angular differential between the axial centerline of each limb segment at each joint.

These joint angles may be measured and recorded via, for example and not by way of limitation, any number of methods. In particular embodiments, the joint angles may be determined based on a 3D virtual model of the robotic limb constructed by the computing system. In particular embodiments, one or more joint encoders located on the surface of or internal to the robotic limb may measure and record the joint angles. In particular embodiments, the joint angles may be measured and recorded via radiofrequency time of flight, which utilize external duplex capable antenna hardware and one or more RFID tags equipped to the robotic limb. In yet another embodiment the joint angles may be measured through electromagnetic tracking technologies. In yet another embodiment, the joint angles may be measured via a marker-based vision system, for example, but not by way of limitation fiducial markers or Optitrack.

In particular embodiments, the computing device may further determine the pose of one or more objects contained within a scene. This pose may be based on at least the segmented image data. The current pose of one or more objects may be determined in any number of ways, for example and not by way of limitation, relative to a fixed point in the scene, relative to a location of a portion of the robotic limb, relative to the sensor(s), or relative to one or more other objects contained within the scene.

Figure 5B:
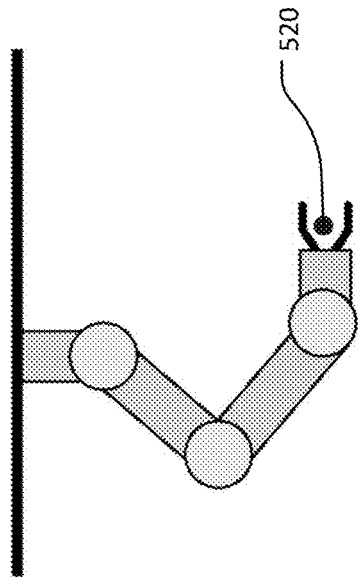

At step 240, the computing system determines a goal pose of the robotic limb. FIG. 5B illustrates an example goal pose of robotic limb 100. In FIG. 5B the computing system determines that end effector 115 should be in goal pose 520, in contrast to the current pose 510 of end effector 115 in FIG. 5A. This goal pose can be based on any number of factors. In particular embodiments, the goal pose may be based on data obtained from any number of sources, including for example and not by way of limitation the segmented image data. In particular embodiments, the goal pose may be based on the pose of one or more objects contained within the scene. In particular embodiments, the goal pose may be based on the pose of a portion of one or more objects contained within the scene. In particular embodiments, the goal pose may be based on a physical interaction between the robotic limb and one or more objects within the scene. In particular embodiments, the goal pose may be based on avoiding intersection or collision between the robotic limb and one or more objects within the scene. In particular embodiments, the goal pose may be a pose set by a user such as, for example and not by way of limitation, a pose for the robotic limb to assume when the robotic limb is not in use (a standby pose). In particular embodiments, the goal pose may be the pose of the robotic limb as calculated by, e.g., joint encoders without accounting for the slack caused by the robotic system's components. In other words, the goal pose may be the pose that the hardware components of the robotic system measure the robotic limb to be in, which may not match the robotic limb's actual pose. Thus, the goal pose may result in a corrected pose that is more accurate than that determined by the robotic system's hardware, and may even result in that hardware calculating that the true goal pose of the robot limb is inaccurate (i.e., due to the inaccuracies in the hardware components' determinations).

In some embodiments the goal pose may involve a physical interaction between robotic limb 100 and one or more objects contained within a scene. For example, robotics may have difficulty with correct posing to physically interact with objects without the object slipping or improperly rotating while in the grasp of a robotic limb. FIG. 4 illustrates how the partial segmentation of objects previously described herein helps the computing system determine a proper goal pose for robotic limb 100. For example, if the goal pose of robotic limb 100 is to grasp coffee mug 410 without spilling its contents, the goal pose should involve grasping the mug at a position where its contents will not spill due to unwanted slipping or rotation of coffee mug 410 while in the grasp of robotic limb 100. FIG. 4 identifies this partial segmentation, where grasping coffee mug 410 in the middle of the mug base 415, or alternatively middle of the mug handle 420 will produce the desired result, while grasping coffee mug 410 at the edges of the base 425 or the edges of the handle 430 will result in rotating or tipping of the mug, spilling its contents. Thus, to produce the desired pose, the computing system may utilize the segmentation and classification of one or more portions to obtain the difference between the desired goal pose. As another example example, if the goal pose of robotic limb 100 is to pour coffee into coffee mug 410, the goal pose should involve robotic limb pouring the coffee into area 435, such that robotic limb 100 does not spill the coffee outside coffee mug 410, resulting in a spill. FIG. 4 identifies this partial segmentation, where pouring coffee into volume area 435 will produce the desired result. Thus, to produce the desired pose, the computing system may utilize the segmentation and classification of one or more portions to obtain the difference between the desired goal pose.

At step 250, the computing system can determine a difference between the current pose of the robotic limb and the goal pose of the robotic limb. In particular embodiments, the computing system may determine the current pose of the robotic limb using one or more methods described herein, such as a 3D virtual model of the robotic limb adjusted using depth image data or from data from one or more joint encoders. Based on this current pose, the computing system determines the difference between this current pose and a defined goal pose.

Figure 5C:
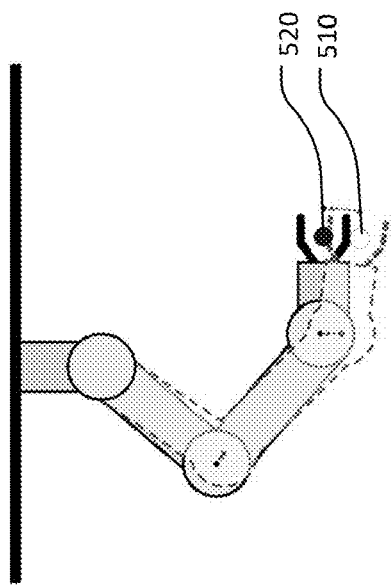

FIG. 5C illustrates an example difference between the current pose 510 and the goal pose 520 of end effector 115 of robotic limb 100. In FIG. 5C the computing system determines this difference between the two poses, which may involve differentials in the current pose and the goal pose between one or more limb segments 105, joints 110, end-effectors 115, and fingers 120. The difference between the current pose and the goal pose may differ due to any number of factors that are detailed herein by way of example and not by way of limitation.

In particular embodiments, the difference between the current pose and the goal pose may differ due to imperfections of one or more components of the robotic limb, including for example and not by way of limitation, mechanical imperfections, natural wear of the one or more components of the robotic limb over time, improper initial calibration, heat expansion of one or more components in the robotic limb over time, or cable stretch due to repeated loading cycles on the robotic limb over time. In this embodiment, the computing system may determine a differential of one or more limb segments 105, joints 110, end-effectors 115, and fingers 120 as a result of at least one of these imperfections, where the goal pose differs from the current pose due to one or more of these imperfections.

In particular embodiments, the difference between the current pose and the goal pose may differ due to a load on robotic limb 100 while grasping an object. In this embodiment, the computing system may determine a differential of one or more limb segments 105, joints 110, end-effectors 115, and fingers 120 as a result of this constant loading on robotic limb 100, where the goal pose differs from the current pose due to this constant loading.

In particular embodiments, this goal pose may include physical interaction with one or more objects. In particular embodiments, the computing system can be used to improve object manipulation accuracy for objects located within the environment. This interaction may include for example and not by way of limitation grasping, pushing, pulling, rotating, twisting one or more objects in the scene by robotic limb 100. In this embodiment, the computing system may determine a differential of one or more limb segments 105, joints 110, end-effectors 115, and fingers 120 as to achieve the desired physical interaction between robotic limb 100 and one or more objects.

From this difference between the current pose and the goal pose of the robotic limb, the computing system may provide at step 260 a pose adjustment for the robotic limb. This pose adjustment may involve a movement of one or more limb segments 105, joints 110, end-effectors 115, and fingers 120. The pose adjustment may include any number of (1) translational movements in any direction of one or more limb segments 105, joints 110, end-effectors 115, and fingers 120 on robotic limb 100; or (2) rotational movements in any direction of one or more limb segments 105, joints 110, end-effectors 115, and fingers 120 on robotic limb 100.

In particular embodiments, this pose adjustment may be to obtain a static goal pose of robotic limb 100. In this embodiment, the pose adjustment may include any movement described herein of one or more limb segments 105, joints 110, end-effectors 115, and fingers 120 to obtain the desired goal pose. In this embodiment, the pose adjustment may be required due to at least the one or more mechanical imperfections discussed above or due to a constant load on the robotic limb while grasping an object.

Figure 6B:
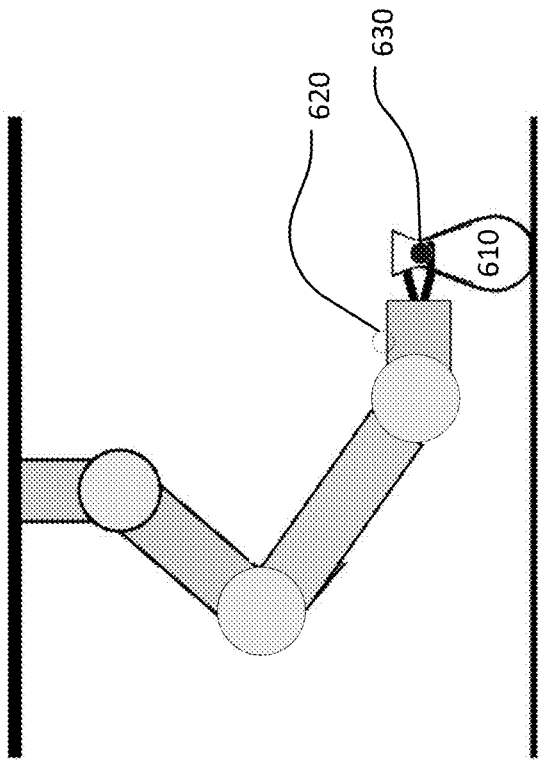
FIGS. 6A and 6B illustrate a running example of adjusting a robotic limb from a current pose to a goal pose that involves a physical interaction with an object in a scene.
Figure 6A:
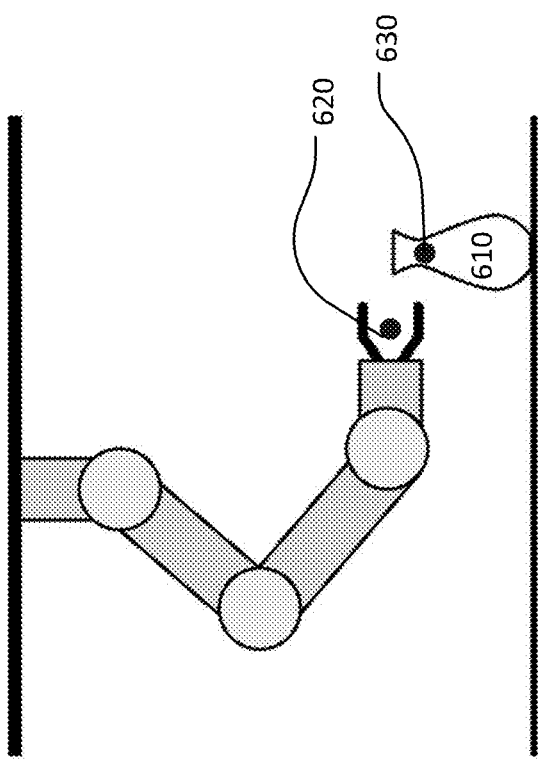

In particular embodiments, the pose adjustment may be to obtain a goal pose that involves physical interaction between the robotic limb and the one or more objects located within the scene. In this embodiment, the pose adjustment includes a three-dimensional path that is related to object positioning or object manipulation within the scene. FIG. 6 illustrates an example of a goal pose that involves a physical interaction between an object 610 and robotic limb 100 contained within a scene. In FIG. 6A, the end effector 115 of robotic limb 100 is located in a current pose 620. Based on any of the methods described herein, the computing system has determined the goal pose requires end effector 115 moving to goal pose 630 and grasping object 610. FIG. 6B illustrates a pose adjustment through spatial awareness to achieve goal pose 630 from current pose 620. In this example, the pose adjustment requires the translational movement of one or more limb segments 105, joints 110, end-effectors 115, and fingers 120 on robotic limb 100 to grasp object 610. As explained above and illustrated in FIGS. 6A-B, the goal pose may depend on the determined pose of other objects in the scene or portions of objects in the scene (or both), such as object 610 and the specific portion of object 610 intended to be grasped.

A physical interaction between the robotic limb and the one or more objects may include for example and not by way of limitation the robotic limb: grasping and holding one or more objects in a static pose; grasping, moving, and subsequently releasing one or more objects from a first position in the scene to a second position within the scene; stirring the contents contained within an object (such as in a coffee mug or mixing bowl); pouring the contents of one object into another object (such as pouring a volume from a bottle of vegetable oil into a mixing bowl for baking); or repeating a physical movement between objects (such as holding a hammer and repeatedly driving it into another object).

Figure 7C:
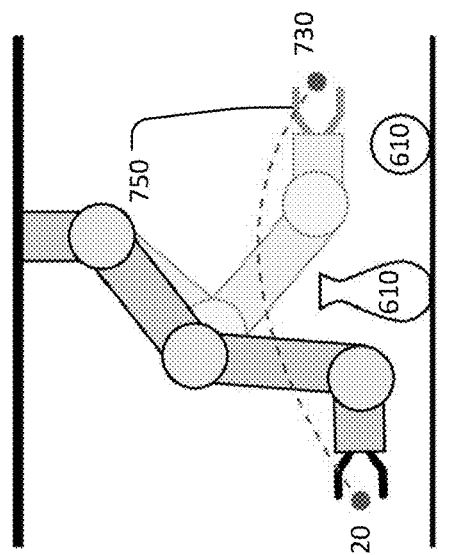
FIGS. 7A, 7B, and 7C illustrate a running example of adjusting a robotic limb from a current pose to a goal pose while utilizing object avoidance and spatial awareness.
Figure 7B:
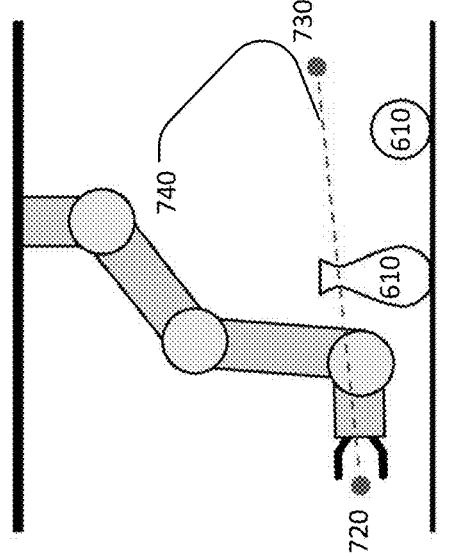
Figure 7A:
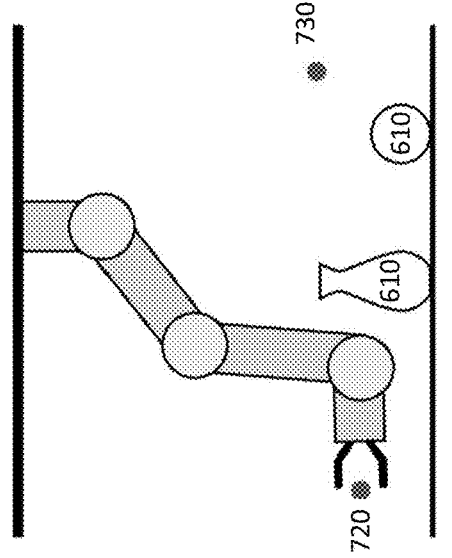

In particular embodiments, the pose adjustment may be to obtain a goal pose that involves the robotic limb avoiding one or more other objects located within the scene. In this embodiment the pose adjustment includes a three-dimensional path that is related to path planning with spatial awareness of the robotic limb, thus permitting movement by the robotic limb through a scene without colliding with one or more objects. FIG. 7 illustrates an example scene with path planning to avoid an object. In FIG. 7A, the end effector 115 of robotic limb 100 is located in a current pose 720. Based on any of the methods described herein, the computing system has determined the goal pose requires end effector 115 moving to goal pose 730. FIG. 7B illustrates a pose adjustment through path planning to achieve goal pose 730 from current pose 720. Under a path planning approach, the computing system may provide a series of waypoints such that robotic limb 100 follows path 740, which results in an intersection and collision with one or more objects 610 located within the scene. In contrast, FIG. 7C illustrates a pose adjustment through path planning with spatial awareness to achieve goal pose 730 from current pose 720. In this embodiment, the computing system utilizes the methods herein to identify one or more objects 610 located in the scene between the current pose 720 and goal pose 730, and provides intermediary waypoints and pose adjustments such that robotic limb 100 follows path 750, which permits robotic limb 100 to move from current pose 720 to goal pose 730 without intersecting or colliding with one or more objects 610 located within the scene.

Particular embodiments may combine one or more aspects of the features described herein. For example, determining a goal pose and obtaining the goal pose for a robotic limb may include segmenting an image to determine the robotic limb's current pose and the current pose of other objects in the scene. The segmentation may determine (1) a portion of an object to grasp (i.e., the goal pose) (2) the presence of one or more other objects in the robotic limb's path to the goal pose and (3) the presence of slack that would affect the robotic limb's ability to grasp the goal object in the desired pose. Segmentation of the image data may thus be used to pose the robotic limb in its goal pose without hitting other objects and evidencing the inaccuracies caused by slack.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for adjusting poses of a robotic limb accordingly until a desired pose is reached including the particular steps of the method of FIG. 2, this disclosure contemplates any suitable method for adjusting poses of a robotic limb accordingly until a desired pose is reached. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 8:
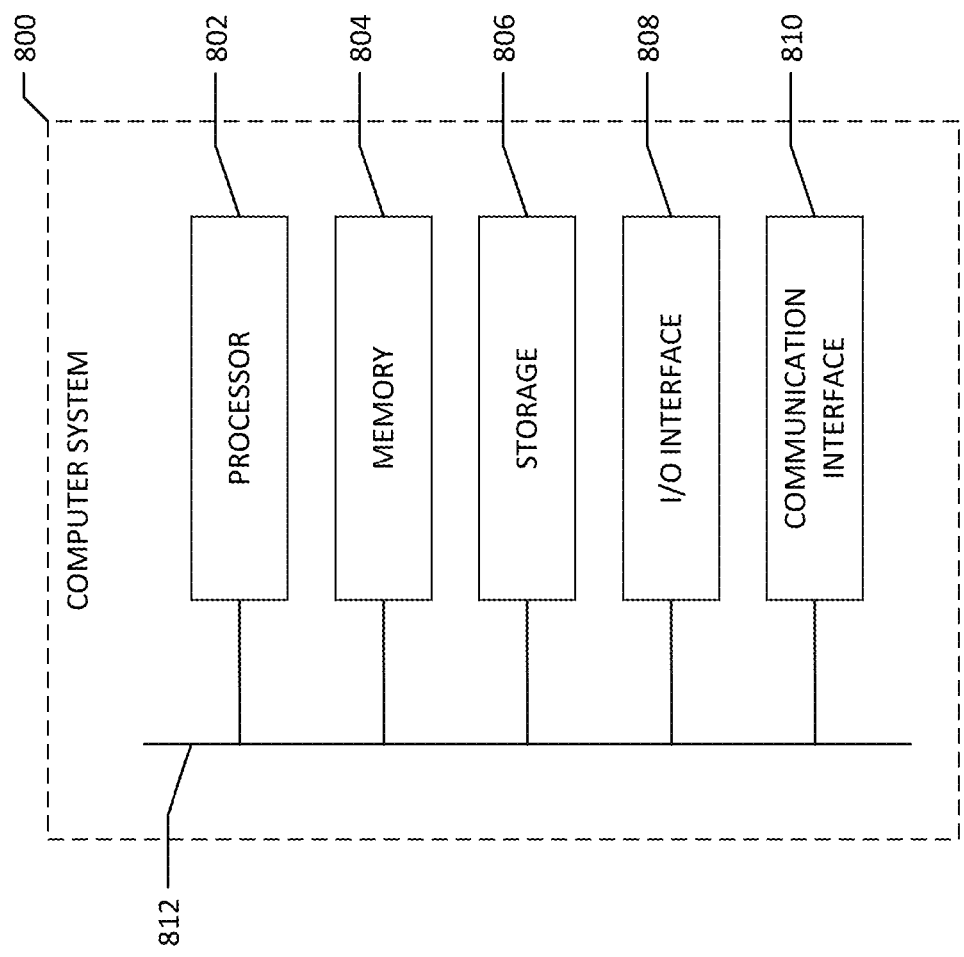
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    accessing, by a computing device, image data representing a scene including at least a portion of an object;
    segmenting, by the computing device, the image data to isolate at least a portion of the image data representing at least one or more areas of the object, wherein the one or more areas of the object are based on one or more preferred interaction areas for the object;
    determining, by the computing device, a current pose of a portion of a robotic limb based on at least one or more of:
        the segmented portion of the image data;
        joint data from one or more joint encoders of the robotic limb; or
        a three-dimensional (3D) virtual model of the robotic limb;
    determining, by the computing device, a goal pose of the portion of the robotic limb based at least on one or more of:
        the segmented portion of the image data; or
        the 3D virtual model of the robotic limb;
    determining, by the computing device, a difference between the current pose and the goal pose of the portion of the robotic limb; and
    providing, by the computing device and based on the determined difference, a pose adjustment for the robotic limb.

2. The method of claim 1, comprising:
    accessing, by the computing device, one or more measured joint angles of the robotic limb, wherein the measured joint angles are based on the joint data;
    determining, by the computing device and based on the one or more measured joint angles, a measured pose of the portion of the robotic limb; and
    determining, by the computing device, the current pose of the portion of the robotic limb, wherein the goal pose of the portion of the robotic limb is further based at least on a difference between the current pose of the portion of the robotic limb and the measured pose of the portion of the robotic limb as determined based on the measured joint angles.

3. The method of claim 2, wherein the current pose of the robotic limb is determined based at least in part on the image data.

4. The method of claim 1, wherein the pose adjustment utilizes a three-dimensional path from the current pose to the goal position for the robotic limb to avoid at least one of the object or another object included in the scene represented via the image data.

5. The method of claim 1, further comprising determining, by the computing device and based on the segmented portion of the image data, a current pose of the object, wherein the goal pose of the portion of the robotic limb is based on the current pose of the object.

6. The method of claim 5, further comprising:
    identifying, by the computing device and based on the segmented portion of the image data, a current pose of the one or more areas of the object; and
    the goal pose of the portion of the robotic limb is further based on the current pose of the one or more areas of the object.

7. The method of claim 1, wherein the goal pose of the portion of the robotic limb is further based on a physical interaction between the robotic limb and the object.

8. The method of claim 7, wherein the physical interaction comprises contacting one or more of the preferred interaction areas of the object.

9. One or more computer-readable non-transitory storage media embodying software that is operable when executed to cause one or more processors to perform operations comprising:
- accessing, by a computing device, image data representing a scene including at least a portion of an object;
- segmenting, by the computing device, the image data to isolate at least a portion of the image data representing at least one or more areas of the object, wherein the one or more areas of the object are based on one or more preferred interaction areas for the object;
- determining, by the computing device, a current pose of a portion of a robotic limb based on at least one or more of:
  - the segmented portion of the image data;
  - joint data from one or more joint encoders of the robotic limb; or
  - a three-dimensional (3D) virtual model of the robotic limb;
- determining, by the computing device, a goal pose of the portion of the robotic limb based at least on one or more of:
  - the segmented portion of the image data; or
  - the 3D virtual model of the robotic limb;
- determining, by the computing device, a difference between the current pose and the goal pose of the portion of the robotic limb; and
- providing, by the computing device and based on the determined difference, a pose adjustment for the robotic limb.

10. The storage media of claim 9, wherein the operations further comprise:
- accessing, by the computing device, one or more measured joint angles of the robotic limb, wherein the measured joint angles are based on the joint data;
- determining, by the computing device and based on the one or more measured joint angles, a measured pose of the portion of the robotic limb; and
- determining, by the computing device, the current pose of the portion of the robotic limb, wherein the goal pose of the portion of the robotic limb is further based at least on a difference between the current pose of the portion of the robotic limb and the measured pose of the portion of the robotic limb as determined based on the measured joint angles.

11. The storage media of claim 9, wherein the current pose of the robotic limb is determined based at least in part on the image data.

12. The storage media of claim 9, wherein the pose adjustment utilizes a three-dimensional path from the current pose to the goal position for the robotic limb to avoid at least one of the object or another object included in the scene represented via the image data.

13. The storage media of claim 9, wherein the operations further comprise determining, by the computing device and based on the segmented portion of the image data, a current pose of the object, wherein the goal pose of the portion of the robotic limb is based on the current pose of the object.

14. The storage media of claim 13, wherein the operations further comprise:
- identifying, by the computing device and based on the segmented portion of the image data, a current pose of the one or more areas of the object; and
- the goal pose of the portion of the robotic limb is further based on the current pose of the one or more areas of the object.

15. The storage media of claim 9, wherein the goal pose of the portion of the robotic limb is further based on a physical interaction between the robotic limb and the object.

16. The storage media of claim 15, wherein the physical interaction comprises contacting one or more of the preferred interaction areas of the object.

17. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
- accessing, by a computing device, image data representing a scene including at least a portion of an object;
- segmenting, by the computing device, the image data to isolate at least a portion of the image data representing at least one or more areas of the object, wherein the one or more areas of the object are based on one or more preferred interaction areas for the object;
- determining, by the computing device, a current pose of a portion of a robotic limb based on at least one or more of:
  - the segmented portion of the image data;
  - joint data from one or more joint encoders of the robotic limb; or
  - a three-dimensional (3D) virtual model of the robotic limb;
- determining, by the computing device, a goal pose of the portion of the robotic limb based at least on one or more of:
  - the segmented portion of the image data; or
  - the 3D virtual model of the robotic limb;
- determining, by the computing device, a difference between the current pose and the goal pose of the portion of the robotic limb; and
- providing, by the computing device and based on the determined difference, a pose adjustment for the robotic limb.

18. The system of claim 17, wherein the operations further comprise:
- accessing, by the computing device, one or more measured joint angles of the robotic limb, wherein the measured joint angles are based on the joint data;
- determining, by the computing device and based on the one or more measured joint angles, a measured pose of the portion of the robotic limb; and
- determining, by the computing device, the current pose of the portion of the robotic limb, wherein the goal pose of the portion of the robotic limb is further based at least on a difference between the current pose of the portion of the robotic limb and
- the measured pose of the portion of the robotic limb as determined based on the measured joint angles.

19. The system of claim 18, wherein the current pose of the robotic limb is determined based at least in part on the image data.

20. The system of claim 17, wherein the pose adjustment utilizes a three-dimensional path from the current pose to the goal position for the robotic limb to avoid at least one of the object or another object included in the scene represented via the image data.

\* \* \* \* \*